United States Patent [19]
Ohteru

[11] Patent Number: 5,157,709
[45] Date of Patent: Oct. 20, 1992

[54] RADIO COMMUNICATIONS SYSTEM ADAPTIVELY ASSIGNING CHANNELS USING POWER LEVELS OF IDLE CHANNELS

[75] Inventor: Youichi Ohteru, Tokyo, Japan

[73] Assignee: NEC Corporation, Tokyo, Japan

[21] Appl. No.: 529,281

[22] Filed: May 29, 1990

[30] Foreign Application Priority Data

May 29, 1989 [JP] Japan .................................. 1-132765

[51] Int. Cl.$^5$ ..................... H04M 11/00; H04B 15/00
[52] U.S. Cl. ......................................... 379/58; 379/63; 455/56.1; 455/63
[58] Field of Search ................................... 379/58–61, 379/63; 455/54, 56, 62, 63, 67

[56] References Cited

U.S. PATENT DOCUMENTS

| | | | |
|---|---|---|---|
| 4,144,496 | 3/1979 | Cunningham et al. | 455/54 |
| 4,328,581 | 5/1982 | Harmon et al. | 455/62 |
| 4,736,453 | 4/1988 | Schloemer | 455/56 |
| 4,783,780 | 11/1988 | Alexis | 379/63 |
| 4,881,271 | 11/1989 | Yamauchi et al. | 379/58 |

OTHER PUBLICATIONS

Y. Furuya et al., "Channel Segregation, A Distributed Adaptive Channel Allocation Scheme for Mobile Communication Systems", Proceedings of Second Nordic Seminar on Digital Land Mobile Radio Communication, Oct. 1986.

Primary Examiner—Thomas W. Brown
Assistant Examiner—Dwayne D. Bost
Attorney, Agent, or Firm—Sughrue, Mion, Zinn, Macpeak & Seas

[57] ABSTRACT

In a mobile radio communications system comprising a control station and base stations, each base station is capable of sensing power levels of signals received on idle channels. In response to a polling signal periodically sent from the control station, each base station returns a signal indicating the detected power levels, the identifications of the idle channels, the identification of a busy channel or no-busy channel indication, and the identification of each of the base stations. The control station derives an interference table from the contents of the signals received from all base stations. The table defines interference coefficients between all pairs of base stations in matrix form according to the identifications of the idle and busy channels and the identifications of the base stations. From the interference coefficients a plurality of interference estimations are derived for all possible combinations of channels and base stations. A minimum value of the interference estimations is detected and the channels associated with the minimum value are assigned to the base stations. The assigned channel identifiers are communicated from the control station to the base stations.

5 Claims, 4 Drawing Sheets

- 20: BASE STATION IDENTIFIER
- 21: BUSY CHANNEL IDENTIFIER
- 22: IDLE CHANNEL IDENTIFIERS & POWER LEVEL OF IDLE CHANNELS

INTERFERENCE MATRIX

CONTROL STATION

RADIO COMMUNICATIONS SYSTEM ADAPTIVELY ASSIGNING CHANNELS USING POWER LEVELS OF IDLE CHANNELS

BACKGROUND OF THE INVENTION

The present invention relates generally to mobile radio communications systems, and more specifically to an adaptive channel assignment technique that assigns channels using data collected from distributed base stations.

In the conventional cellular mobile radio communications system in which the service area is divided into cells covering an area of several tens of kilometers in diameter, radio channels are permanently assigned to the cells for establishing communications with mobile stations. For saving channel resources, the same frequencies are assigned to different cells if interference between them is acceptable. To meet the growing needs of mobile communications, a microcellular system has been proposed. According to this system, the service area is divided into "microcells" of diameter of several hundreds meters to reuse the same frequencies by a greater number of microcells and base stations with antennas as high as traffic lights are located in the respective microcells. However, difficulty arises in deploying base stations at regular intervals due to the presence of obstacles in the line-of-sight propagation, and hence their locations are not necessarily optimum from the view point of wave propagation and a very complex pattern of reflections from surrounding structures is likely to result. Furthermore, the pattern of interferences between microcells is very difficult to predict due to changing environments, and must therefore be updated at intervals after installation.

An adaptive channel assignment scheme is described in "Channel Segregation, A Distributed Adaptive Channel Allocation Scheme for Mobile Communication Systems", Yukitsuna Furuya et al., Proceedings of Second Nordic Seminar on Digital Land Mobile Radio Communication, October 1986. According to this scheme, each base station has a carrier sense function and controls the priority of channels depending on their busy/idle status. If a channel is sensed as being idle by a given station, that channel is given highest priority to be used by that station. With high probability of chances other stations will detect this channel as being busy and decrease their priority of this channel. Channel priorities are regularly updated so that carrier sense errors are minimized.

SUMMARY OF THE INVENTION

It is an object of the present invention to provide a mobile radio communications system in which channels are adaptively assigned to base stations by a control station on the basis of data periodically collected from the base stations.

According to the present invention, there is provided a mobile radio communications system which comprises a plurality of base stations capable of establishing radio communications with mobile stations, and a control station. Each of the base stations is capable of detecting power levels of signals received on idle channels, and is responsive to a polling signal periodically sent from the control station for transmitting a response signal indicating the detected power levels, the identifications of the idle channels, the identification of a busy channel if there is one or no-busy channel indication, and the identification of each of the base stations. The control station receives the response signals from all base stations and derives an interference table from the contents of the received signals, the table containing interference coefficients between pairs of base stations arranged in a matrix pattern according to the identifications of the idle and used channels and the identifications of the base stations. From the interference coefficients a plurality of interference estimations are derived for all possible combinations of channels and the base stations. A minimum value of the interference estimations is detected and the channels associated with the minimum value are assigned to the base stations.

BRIEF DESCRIPTION OF THE DRAWINGS

The present invention will be described in further detail with reference to the accompanying drawings, in which.

DETAILED DESCRIPTION

Figure 1:
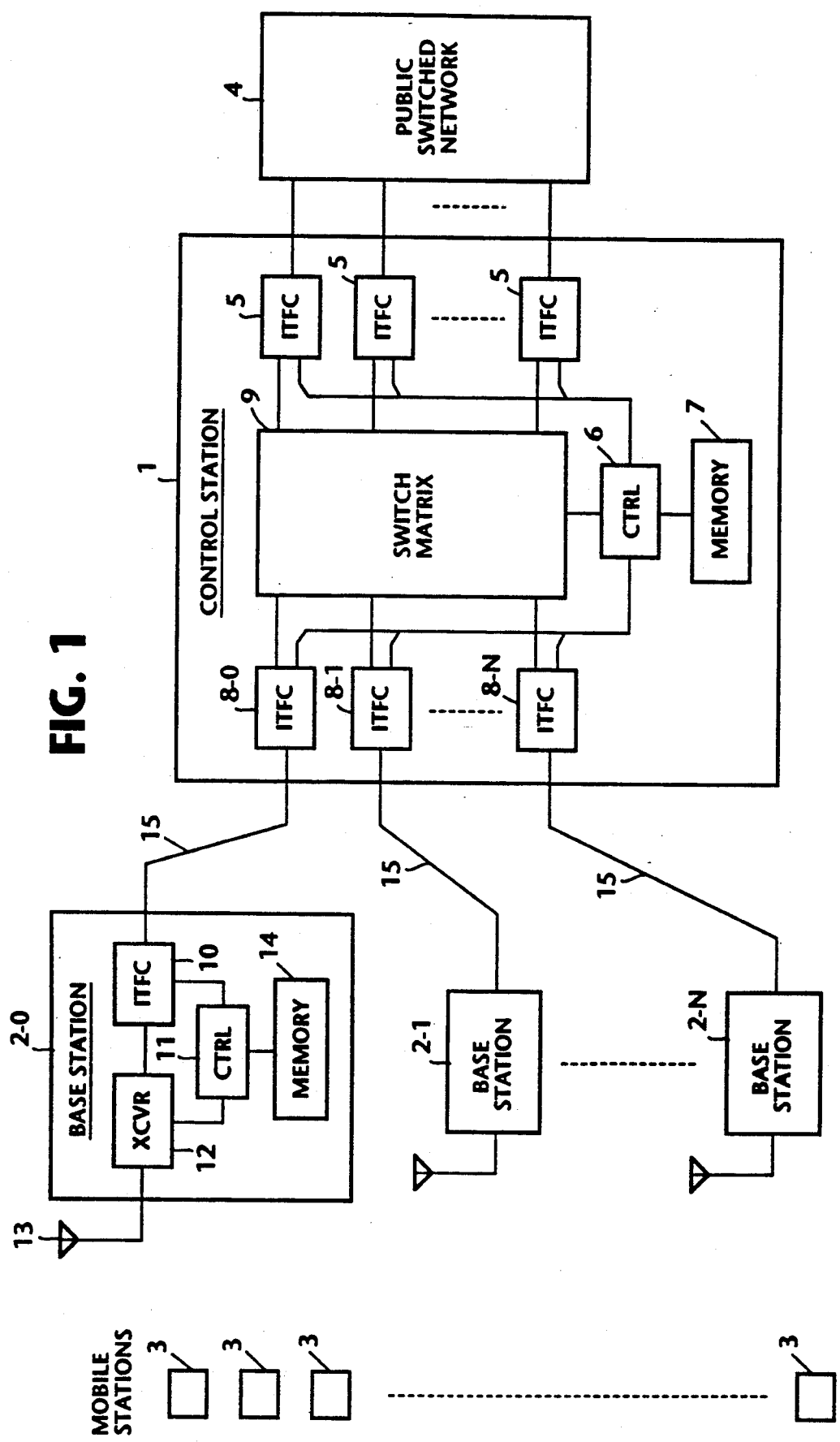
FIG. 1 is a block diagram of a mobile radio communications system of the present invention.

Referring now to FIG. 1, there is shown a land mobile radio communications system embodying the present invention. The system comprises a control station 1 connected to the public switched telecommunication network 4, and base stations 2-O through 2-N which are connected by transmission lines 15 to control station 1 to exchange control signals to establish radio communication paths with any of mobile stations such as hand-held personal telephones 3.

Base stations 2-O~2-N are located in respective zones, or microcells. Typically, the base stations are spaced apart a distance of several hundred meters. Each base station is tuned to any radio channels of the system according to the adaptive channel assignment scheme of the present invention. To save frequency resources, radio channels of the same frequency range are used by more than one base stations wherever interference between the microcells is below an acceptable level.

Control station 1 includes a plurality of exchange line interfaces 5 which are connected respectively to corresponding line terminals of the public switched network 4 for exchanging control signals as well as speech or data signals with the network 4. A controller 6 receives signals from line interfaces 5 as well as from station line interfaces 8-O~8-N which are in turn connected through lines 15 to corresponding base stations 2-O~2-N. A switch matrix 9 is provided to establish a communication path between exchange line interfaces 5 and station line interfaces 8 in accordance with a switching signal supplied from controller 6. In a manner as will be described later, controller 6 consults with a memory 7 to perform adaptive channel assignment based on observations received from all the base stations.

Figures 2, 4:
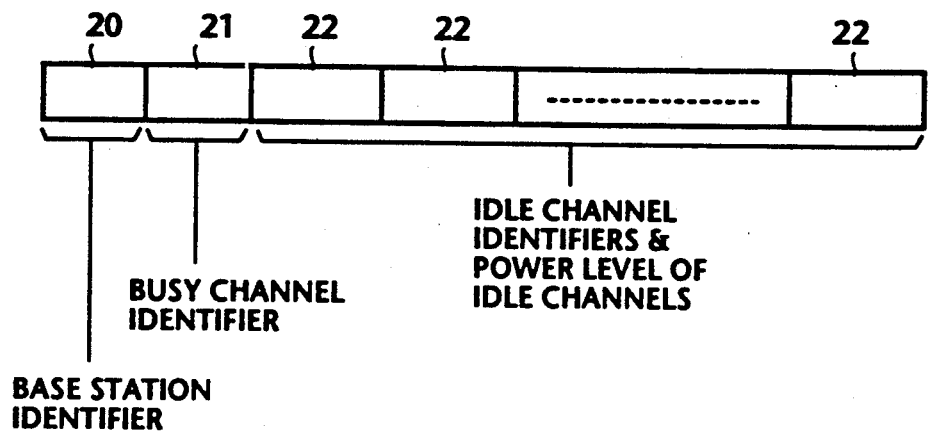
FIG. 2 shows a data format in which observation results are transmitted from each base station to the control station.
FIG. 4 is an illustration of an interference matrix stored in the memory of the control station of FIG. 1.

Each base station comprises a line interface 10 connected to the associated transmission line 15, a controller 11, and a transceiver 12 which is connected to antenna 13. Controller 11 is connected to transceiver 12 to control its local oscillator according to a control signal received from the control station through line interface 10 to establish a radio communication path with a mobile station. As will be described, if a base station is in session with a mobile station through a certain channel, the transceiver 12 of this base station is further controlled to scan idle channels and detects their power levels and transmits a signal as an observation to the control station to communicate the busy channel number, the detected power levels of the idle channels in a specified data format as shown in FIG. 2. A memory 14 is provided to store the identifier of a channel assigned to its base station by the control station and those of channels assigned to other base stations. By consulting with the memory 14, each base station establishes a session (communication) with each mobile station.

On receiving a channel setup request from the control station, each base station consults the memory 14 to identify which channel is currently assigned and examines the power level of the carrier of the assigned channel to determine whether the assigned channel is available for use, or not. If the assigned channel is used by another station, the base station proceeds to hunt for an idle channel by sensing the power level of its carrier level.

Figure 3A:
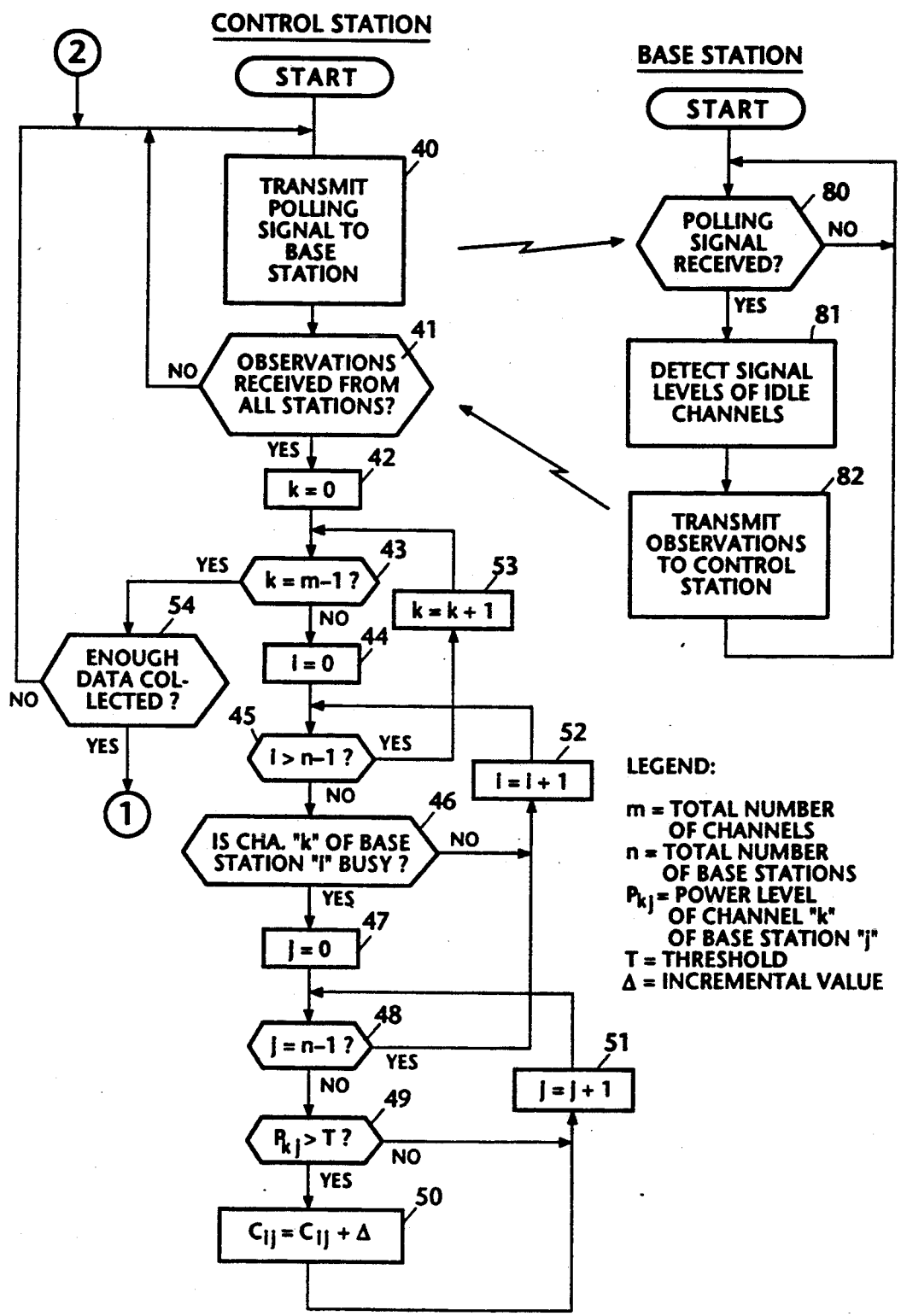
FIGS. 3A and 3B are flowcharts of the adaptive channel assignment of this invention which performed by the base stations and control station of the system.
Figure 3B:
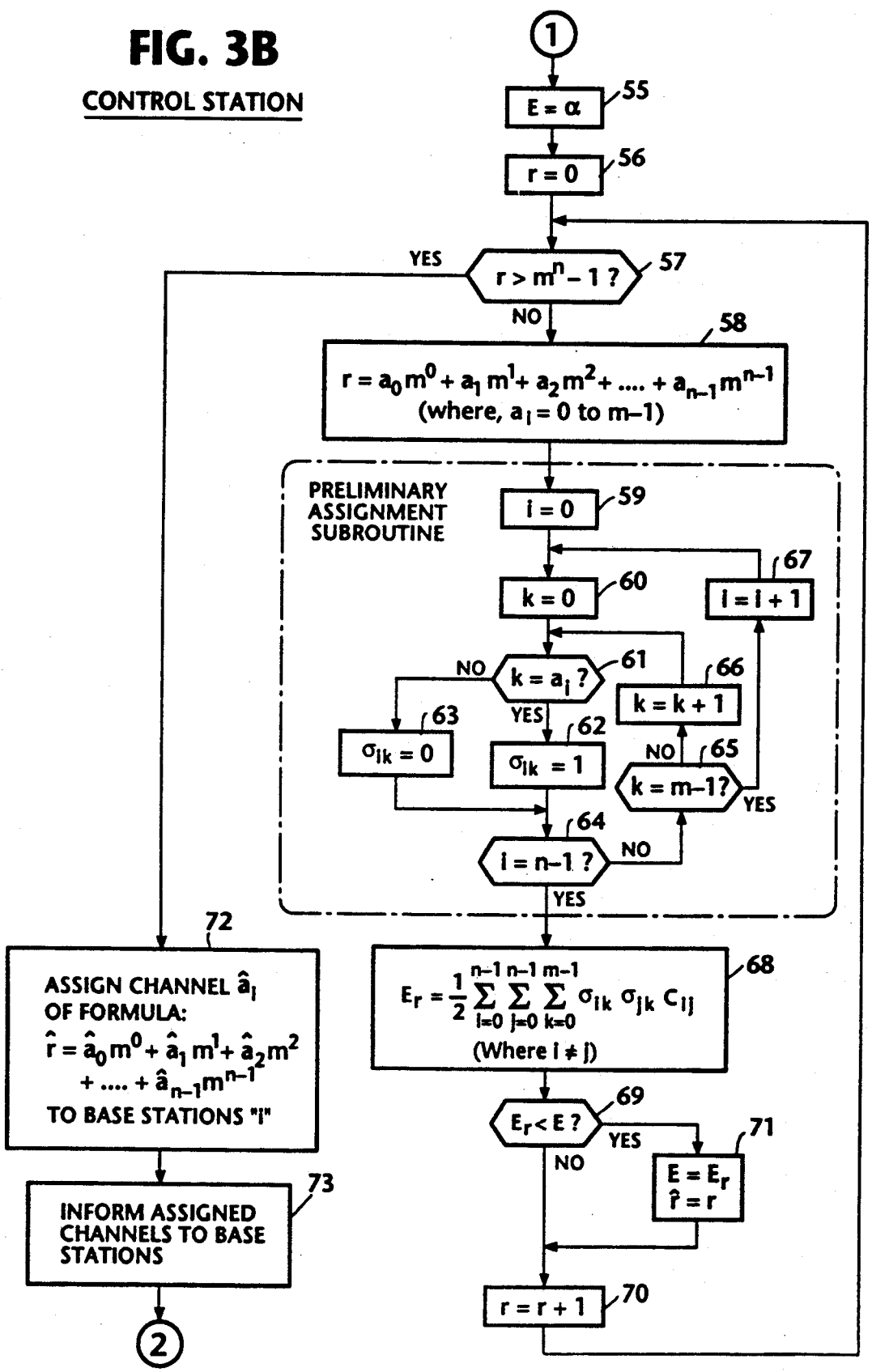

The controller 6 of control station 1 is a microprocessor-based controller which is programmed to perform adaptive channel assignment according to a sequence of instructions in cooperation with each of the base stations 2-0~2-N in a manner as shown in FIGS. 3A and 3B.

In FIG. 3A, control station 1 starts executing an adaptive channel assignment routine by initially transmitting a polling signal to each base station (step 40). On receiving a polling signal (step 80), each base station senses the power level of idle channels and goes to step 81 to transmit a response signal as an observation in a format shown in FIG. 2. Each observation contains a station identifier field 20 in which the base station identifier is inserted, and a busy channel identifier field 21 in which the identifier of a busy channel is inserted if it is in session with a mobile station or no-busy channel indication is given if all channels are idle. A series of idle channel fiels 22 follow the field 21 to insert idle channel identifiers and power levels of the idle channels.

When an observation is received from each base station, controller 6 stores it into memory 7. If observations are received from all base stations (step 41), control advances to step 42 to initialize a channel identification variable k to 0 and goes to step 43 to check to see if variable k is equal to m−1, where m is the total number of channels. If the answer is affirmative, control exists to step 44 to initialize a base-station identification variable i to 0. Exit then is to step 45 which checks to see if variable i is equal to n−1, where n is the total number of base stations. If i is smaller than n−1, control exits to step 46 to check to see if channel k of base station i is busy or not by examining the contents of busy/idle status field 21 of the stored observation which was received from base station i. If step 46 makes an affirmative decision, exit is to step 47 to initialize another base station identifier j to 0. Control then exits to step 48 to check to see if j is equal to n−1. If not, it advances to step 49 to check to see if the power level $(P_{kj})$ of channel k of base station i is higher than a threshold value T. If it is, control moves to step 50 to add an incremental value $\Delta$ to an interference value $C_{ij}$ between base stations i and j. If the decision is negative in step 49, control moves to step 51 to increment j by 1 and returns to step 48, and $(P_{kj})$ to repeat the steps 48 to 51, so that variable j is successively incremented until it becomes equal to n−1 and a set of interference coefficients $C_{ij}$ are generated for a given base station i with respect to a channel k and stored into memory 7.

Control now exits from step 48 to step 52 to increment variable i by 1 and returns to step 45 to repeat the steps 46 to 51 to generate a set of interference coefficients $C_{(i+1)j}$ for a base station (i+1). In this way, variable i is successively incremented until it becomes equal to n−1 and a plurality of sets of interference coefficients $C_{ij}$ are created for base stations 2-0 through 2-N with regard to the channel k and stored in memory 7. If the decision in step 46 is negative, variable i is incremented in step 52, ignoring steps 47 to 51.

Control now exits from step 45 to step 53 to increment variable k by 1 and returns through step 43 to step 44 to repeat the above process with respect to channel k+1. Therefore, incremental values $\Delta$ are accumulated over previous interference coefficients $C_{ij}$ as variable k is successively incremented and stored in memory 7 in matrix form as shown in FIG. 4. When variable k reaches the maximum value m−1, control exits from step 43 to step 54 to check to see if enough observation data has been collected to ensure that the interference table is reliable. If the answer is negative, control returns to step 40 to collect further observation data; otherwise, control advances to the next channel assignment routine shown in FIG. 3B.

In FIG. 3B, an interference estimation variable E is initialized to a constant $\alpha$ which is a sufficiently large arbitrary number (step 55) and a preliminary assignment variable r is set equal to 0 (step 56). Exit then is to decision step 57 where the variable r is checked against the maximum value of possible channel assignment combinations $m^n-1$. If r is smaller than $m^n-1$ control exits to step 58 in which variable r is represented by an "m"-ary number system as follows:

$$r = a_0.m^0 + a_1.m^1 + a_2.m^2 + a_3.m^3 + \ldots + a_{n-1}.m^{n-1}$$

where $a_0, a_1 \ldots a_{n-1}$ represent the identifiers of channels assigned respectively to base stations #0, #1 . . . #N (=n−1). Control then enters a preliminary assignment subroutine which starts with an initialization step 59 in which base-station variable i is set equal to 0, followed by a second initialization step 60 in which channel variable k is initialized to 0. In step 61, variable k is checked for equality to $a_i$. If the answer is affirmative, a preassignment index $\sigma_{i,k}$ is set equal to 1 in step 62 and if negative, $\sigma_{i,k}$ is set to 0 in step 63, and control exits to step 64 to check if i is equal to n−1. If not, control moves to step 65 to check to see if k is equal to m−1. If the answer is negative, exit is to step 66 to increment k by 1 and control returns to step 61 to determine preassignment indices for the next channel indicated by the incremented k value. It will be seen that $\sigma_{ik}=1$ indicates that channel k is assigned to base station i and $\sigma_{ik}=0$ does not. As control loops through steps 61 to 66, $\sigma_{ik}$ are determined for all channels with respect to base station i. When k=m−1 control exits from step 65 to step 67 to increment variable i by 1 and returns to step 60 to repeat the channel preassignment loop until $\sigma_{i,k}$ are determined for all channels with respect to base station i+1. The process continues until variable i becomes equal to n−1, and control exits the preliminary assignment subroutine and enters a calculation step 68 in which an estimation formula $E_r$ is calculated as follows:

$$E_r = \frac{1}{2} \sum_{i=0}^{n-1} \sum_{j=0}^{n-1} \sum_{l=1}^{m-1} \sigma_{ik} \cdot \sigma_{jk} \cdot C_{ij} \text{ (where } i \neq j)$$

Exit then is to step 69 to check to see if $E_r$ is smaller than variable E. If the answer is affirmative, exit is to step 71 to set $E_r$ to E and set variable r to f̂. Step 70 is executed by incrementing r by 1 following the execution of step 71 or a negative decision in step 69. Control returns to step 57 to repeat the above process. It will be seen that the value E set in step 71 is a minimum value obtained up to this moment, and the value r is representative of the current optimum assignment index. Continuing in this way, the current minimum value E and the optimum combination index f̂ are updated until variable r is incremented to $m^n-1$, whereupon control exits to step 72 to assign channel identifiers $â_i$ of the following formula to base station i:

$$r = â_0 . m^0 + a_1 . m^1 + a_2 . m^2 + a_3 . m^3 + \ldots + a_{n-1} . m^{n-1}$$

Control advances to step 73 to inform the assigned channels to all the base stations. In this way, each base station receives the assigned channel number and stores it into memory 14 which will be later recalled when establishing a radio path to a mobile station. Following the execution of step 73, control returns to step 40 to repeat the adaptive channel assignment routine at periodic intervals.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A mobile radio communications system comprising:
    a plurality of base stations capable of establishing radio communications with mobile stations, each of said base stations being capable of detecting power levels of signals received on idle channels, and responsive to a polling signal for transmitting a response signal indicating the detected power levels, the identifications of said idle channels, the identification of a busy channel if there is one, and the identification of each of said base stations; and
    a control station for transmitting said polling signal to each of said base stations, receiving said response signal from each base station, deriving an interference table from the contents of the received signals, said table containing interference coefficients between pairs of said base stations arranged in a matrix pattern according to the identifications of said idle and used channels and the identifications of said base stations, deriving from said interference coefficients a plurality of interference estimations for all possible combinations of channels and said base stations, detecting a minimum value of said interference estimations, and assigning the channels associated with said minimum value to said base stations.

2. A mobile radio communications system as claimed in claim 1, wherein said control station derives said interference coefficients by detecting whether each of the detected power levels is higher than a specified threshold or not, and successively adding up an incremental value when said power level is detected as being higher than said threshold.

3. A mobile radio communications system as claimed in claim 1, wherein said control station is connected to a switched telecommunications network and is capable of establishing a switched path between any one of said base stations and said network.

4. A mobile radio communications system comprising:
    a plurality of base stations capable of establishing radio communications with mobile stations, each of said base stations periodically detecting power levels of signals received on idle channels, and responsive to a polling signal for transmitting a response signal indicating the detected power levels, the identifications of said idle channels, the identification of a busy channel if there is one, and the identification of each of said base stations; and
    a control station programmed to perform the steps of:
    a) transmitting said polling signal to each of said base stations;
    b) receiving said response signal from each base station;
    c) detecting whether each of the power levels of said idle channels contained in one of said response signals is higher than a specified threshold;
    d) incrementing an interference coefficient of a pair of said base stations by a predetermined amount when said power level is detected as being higher than said threshold, and arranging said coefficient in a matrix pattern according to the identifications of said idle and used channels and the identifications of said base stations;
    e) repeating the steps (c) and (d) until said coefficients are derived for all pairs of said base stations;
    f) deriving from said matrix pattern a plurality of interference estimations for all possible combinations of channels and said base stations;
    g) detecting a minimum value of said interference estimations;
    h) assigning the channels associated with said minimum value to said base stations; and
    i) repeating the steps (a) to (h).

5. A mobile radio communications system as claimed in claim 4, wherein said control station is connected to a switched telecommunications network and is capable of establishing a switched path between any one of said base stations and said network.

* * * * *

UNITED STATES PATENT AND TRADEMARK OFFICE
CERTIFICATE OF CORRECTION

PATENT NO. : 5,157,709
DATED : October 20, 1992
INVENTOR(S) : Youichi OHTERU

It is certified that error appears in the above-identified patent and that said Letters Patent is hereby corrected as shown below:

Col. 3, line 45, delete "fiels" and insert --fields--.

Col. 5, line 17, delete "r" and insert --$\hat{r}$--;

line 25, delete

"$a_1 \cdot m^1 + a_2 \cdot m^2 + a_3 \cdot m^3 + \ldots + a_n$" and insert

--$\hat{a}_1 \cdot m^1 + \hat{a}_2 \cdot m^2 + \hat{a}_3 \cdot m^3 + \ldots + \hat{a}_n$--.

Signed and Sealed this

Twenty-second Day of February, 1994

Attest:

BRUCE LEHMAN

*Attesting Officer*  *Commissioner of Patents and Trademarks*